United States Patent [19]

Rohatyn

[11] Patent Number: 5,149,474

[45] Date of Patent: Sep. 22, 1992

[54] METHOD OF MAKING GLASS FORMING MOLDS OF AN AMORPHOUS FUSED SILICA COMPOSITION

[76] Inventor: Pierre Rohatyn, Le Roc, 30130 St. Alexandre, France

[21] Appl. No.: 567,825

[22] Filed: Aug. 14, 1990

Related U.S. Application Data

[63] Continuation of Ser. No. 174,609, Mar. 29, 1988, abandoned.

[51] Int. Cl.$^5$ ............................................... B29C 33/38
[52] U.S. Cl. ........................................ 264/63; 65/18.1; 249/134; 264/220; 264/333; 264/337
[58] Field of Search ........................ 264/63, 225, 220; 249/134; 65/374.13, 18.1

[56] References Cited

U.S. PATENT DOCUMENTS

| | | | |
|---|---|---|---|
| 3,285,873 | 11/1966 | Bailey | 264/63 |
| 3,607,325 | 9/1971 | Spangler et al. | 264/63 |
| 3,947,550 | 3/1976 | Fitchmum | 264/63 |
| 3,952,083 | 4/1976 | Fletcher et al. | 264/63 |
| 4,533,394 | 8/1985 | Watts | 164/24 |

Primary Examiner—James Lowe
Attorney, Agent, or Firm—William J. Thomashower

[57] ABSTRACT

A mold for the manufacture of non-round glass shapes and method for making such molds. In molds for glass blowing and pressing, especially for producing non-round shapes where molten glass must be in contact with the mold for an extended time, an economical, heat resistant mold adaptable to any shape is produced by mixing defined ratios of water, hydraulic compound and amorphous fused silica to form a pourable composite mixture which is shaped into a mold by placing the mixture on or in a master pattern and curing the mixture at room temperature and then at elevated temperature.

7 Claims, 3 Drawing Sheets

METHOD OF MAKING GLASS FORMING MOLDS OF AN AMORPHOUS FUSED SILICA COMPOSITION

This application is a continuation of application Ser. No. 174,609, filed Mar. 29, 1988, now abandoned.

BACKGROUND OF INVENTION

1. Field of Invention

This invention relates to molds for the manufacture of hollow blown glass and lead crystal glassware and a unique process for making such molds. The invention has particular application for making relatively inexpensive molds, capable of repeated cycles of use, for the manufacture of glass shapes having non-round cross-sections and having a high quality of glass clarity, color and smooth surfaces, all indicative of quality glass production.

2. Description of the Prior Art

In the mass production of hollow glassware items, such as drinking glasses, bowls, vases and the like, the methods of manufacture are primarily two categories: blown and pressed production, either manual, semi, or fully automatic in character.

To mass produce glass shapes having both round and non-round sections, and which will be of a consistent shape, with high quality of clarity, color and surface quality, molds are required for both the blowing and the pressing of these pieces.

In the mass production blowing of round, or circular items, the current method for producing molds consists of carving out a cavity from a block of fresh (i.e. wet) wood, to the desired profile.

It is well known in the art of producing round glassware items to employ such negative molds fabricated from fresh fruitwoods, such as pear wood, (sometimes called "soft tools"), which are maintained sufficiently wet within the mold cavity to permit molten glass having temperatures of 1200° C. to 1900° C. to be placed within the mold and blown to its shape using a constant rotating motion. The molten glass causes the residual moisture in the mold to boil off as steam, creating a vapor layer of steam inside the mold which, with the usual turning and blowing technique well-known in the prior art, will produce a smooth surface and quality glass piece.

Such molds can be either be of one-piece construction, or of multiple molds which are then hinged and supplied with handles for the opening and closing of the mold in order to afford the ingress and egress of the parison. These wood molds are inexpensive to produce, owing particularly to the relatively low cost of the wood, the simple machinery required for fabrication, and the availability of skilled labor for this purpose.

As well known in the art, these wood molds are maintained in the wet state by being constantly immersed in a bath of water when not in use. This serves a number of purposes. First, it reduces the burning of the mold in use, and subsequent cracking, as well as contributing to the maintenance of the roundness of the mold which can last from 200 to 600 production cycles. In addition, the bath provides the residual moisture in the mold, so that when the hot parison is inserted for blowing, steam evaporates along the inside walls of the mold and around its circumference, as has been described. This layer of steam in concert with the rotational action on the parison itself are the two major contributing elements resulting in superior surface quality, owing to the fact that both these result in the parisons never making intimate contact with the inside of the mold. It is this thin layer of steam which imparts the smooth surface to the piece.

It is commonly known in the art that when a glass piece is to be produced in a quantity in excess of about 5000, it is generally more cost effective to produce a steel mold, which offers a useful life in the tens-of-thousands-piece range. For round pieces, this steel mold presents no particular problems of fabrication of the shape as it can be simply produced using common machine tools.

It is well-known that a smooth mold surface is preferable, although the quality of the mold surface need not be the most polished for pieces which will be heavily decorated with cuts, either polished or not, since the cuts will in effect hide most of the surface defects. If, on the other hand, the blown piece will remain undecorated, then the quality of the finished piece is measured by the absence of defects particularly in regard to color, clarity, consistency of surface, and content of foreign objects such as stones, pits and the like. For such undecorated pieces, a mold of the highest quality is required, one which has a highly polished and defect-free surface. Heretofore, these prior art steel molds have been manufactured from a steel alloy offering the least corrosive or oxidating effect on the glass. Such steel alloys are of limited availability.

It is known in the art that the molds must be cooled between cycles. Use of a hot mold tends to cause the glass to stick within the mold cavity, resulting in the destruction of the surface. Unlike the wood molds and the molds of the present invention, the steel molds cannot be cooled with water. The steel molds are cooled with oil, kerosene, or air which is applied directly to the mold surface. Use of air alone slows production and the liquid coolants present problems in the finished blown pieces in that it is quite difficult to rid the glass of these oils. For example, an air-cooled glass molding mechanism for making round cross-section pieces is disclosed in U.S. Pat. No. 3,374,079.

As is apparent from the foregoing description of the prior art, molds for a rotating method of production can be successfully used only when the cross-section of the mold, in a plane generally perpendicular to the axis of rotation, is uniformly round so as to permit rotation of the parison to maintain a layer of steam at all points between the parison and the mold during the rotation and blowing. This rotation method for round cross-section pieces is described for example, in U.S. Pat. Nos. 3,271,123 and 3,374,079 which do not disclose any particular mold material.

A mold for forming glass pieces by the process of sagging a flat sheet of glass is disclosed in U.S. Pat. No. 4,059,428. This patent does not disclose a pourable or room temperature molding composition, as disclosed in the present invention. The process in U.S. Pat. No. 4,059,428 is also not adapted to form molds for non-round shapes, but requires grinding and high temperature heating of a green-glass blank.

When producing blown glass pieces which are non-round in cross-section, such as a square vase, the known methods and tools change dramatically. Due to the non-round shape, the rotating action cannot be used and the molten glass must necessarily come into intimate contact with the mold surface, and maintain such relationship for an extended period of time while the glass cools sufficiently to hold its shape. Instead of a rotary motion applied to the blowpipe, the blower must rely on his skill in the art of blowing, and requires a mold with an inner surface as flawless and perfect as possible, and capable of withstanding contact with the molten glass for two to three times as long as in forming round pieces. The blower must maintain contact between the glass and inner surface of the mold while the glass cools enough to hold the shape, at the same time maintaining uniform wall thickness. This is a longer and more difficult process than for forming round pieces by the rotation method.

Since the fresh wood molds cannot withstand such extended exposure to heat for any economical number of production cycles, it is well known in the prior art to manufacture molds for non-round articles from stainless steel alloys having a low rate of oxidation and distortion when exposed to the glass blowing temperatures. These molds can be highly polished or plated to obtain the proper surface quality and may have service lives of as many as 50,000 production cycles. Fashioning molds from stainless steel alloys is much more expensive and time consuming than fashioning wood molds and poses problems of capital investment and lead time of at least 8–16 weeks to fabricate a steel mold for each new non-round shape. In addition, the stainless steel molds require periodic maintenance, ranging from simple repolishing, to complete replating.

In contrast to the steel molds for round shapes, which can be easily machined from stock on a lathe, a steel mold for a non-round shape must be machined from stock on highly sophisticated milling equipment or through the use of electrode burning. Along with polishing or plating, such molds require substantial time for fabrication, on the order of three to five months and at much greater expense than wood or round steel molds.

Commercial and marketing considerations are a major factor in the decision to undertake such fabrication expenses for new non-round glass shapes. Before making an investment the size of which is required for non-round steel molds, the manufacturer usually prefers to make some sample production using inexpensive molds having limited life.

In the case of round items, there is no problem, since if the samples are successful, the wood molds made with little investment can also be used for full scale production with perfectly satisfactory results, even though it may be necessary to make a number of them to continue production until steel molds are available.

In the case of new non-round shapes, however, although such soft tools can be used to produce five to ten samples, this limited supply may be insufficient for test marketing. Moreover, if the samples are successfully marketed, the long lead time to produce stainless steel molds needed for full scale production prevents the manufacturer from immediately capitalizing on the new shape he introduced and allows time for the shape to be copied and marketed by other manufacturers.

These known problems are exacerbated by the commercial reality that manufacturers will usually desire to test market a new line or collection of shapes and sizes of from fifteen to forty different pieces, many of which may be non-round. Accordingly, for such pieces the commitment of time and money for stainless steel molds must often be made at the earliest stage of marketing just to produce samples, and long before any commercial determination of the saleability of the shape. The business risks in such investment are apparent.

It has been known in some applications, primarily for foundry casting of molten metals, to attempt to make non-steel or pourable refractory molds. For example, certain resin-bonded sand molds have long been known in the foundry industry for producing metal castings, as disclosed, for example, in U.S. Pat. Nos. 2,869,194, 3,005,244, 4,121,646 and 4,336,179. These molds have generally been non-permanent molds in which the resin is burned out by the heat of the molten metal and the mold must be physically broken away from the cast metal piece, thus destroying the mold after each casting and imposing the time and expense of repeated mold making. Such foundry molds also do not provide an as-molded surface of sufficient quality for glass production.

U.S. Pat. No. 3,802,891 discloses a semi-permanent foundry mold composed of wollastonite, a mineral, and a silicious binder which is heated in the range of 2,200° F. to sinter the mold material to final strength. This appears to be limited to a foundry application rather than for producing the high quality surfaces needed for forming glass pieces or for forming a permanent mold capable of producing over 1200 glass pieces as disclosed in the present invention.

Other attempts to produce quality glass, as in the art of non-hollow glass optical elements, include use of fine grained silicon carbide or silicon nitride on a substrate or as the mold composition, as disclosed, for example, in U.S. Pat. No. 4,139,677. This method also requires pre-grinding and polishing of the mold surfaces, and in production requires optical quality glass blanks, induction heating of the molds in a controlled, non-oxidizing atmosphere for press molding with close temperature monitoring throughout the production cycle.

A method of mold making used primarily for soft metal foundry sample molds for temperature applications up to 3000° F. (1600° C.) involves forming the mold from a thermoplastic-thermosetting resin compound and amorphous fused silica using proportions and curing far different from that disclosed in the present invention. Kits containing these pre-measured components for making such foundry molds are sold commercially by A.C.E. Inc. of Plainview, N.Y. The material has also been reported by A.C.E. Inc. for use in shaping glass sheets or cast molten metal apparently for limited production cycles. However, according to the material description provided by A.C.E. Inc., the resulting mold must be "machined" "painted or refinished" to produce smooth mold surfaces.

As disclosed by A.C.E., Inc. the mold materials in the kit must be mixed in the weight ratio 5 lbs. of hydraulic compound powder to about 1.42 lbs. of water to 6.5 lbs. of amorphous fused silica or in a larger quantity but by the non-linear increases in proportions to the ratio 22.8 lbs. of compound to 7.4375 lbs. of water to 34.2 lbs. of amorphous fused silica. Without a kit, A.C.E. Inc. recommends a ratio of 4 lbs. of compound to ½lbs. of water to 6 lbs. of amorphous fused silica. The first mix, compound and water, is to be machine roll mixed at 60 R.P.M. for 5 minutes and this composite is then roll mixed with the amorphous fused silica for 10 minutes at 60 R.P.M., followed by pouring the mold and using only a room temperature cure.

Significantly, A.C.E. Inc. teaches the criticality of the disclosed ratios and recommends against roll mixing the smaller quantity kit, noting "[d]ue to accuracy required, Factory does not recommend this procedure." In addition, it appears that the A.C.E. Inc. molds are not designed for applications at temperatures in excess of 1600° C., whereas the molds of the present invention are routinely used at temperatures as high as 1940° C.

Accordingly, none of the known methods for making non-steel molds has provided molds with the quality, economy and permanance of the present invention for economically producing molds for the manufacture of quality non-round glass pieces in quantity from a single mold.

SUMMARY OF THE INVENTION

The present invention overcomes the problems of the prior art by providing a novel method, using commercially available materials and relatively simple manufacturing techniques, for producing a new and inexpensive kind of mold for glass production for non-round shapes.

Accordingly it is an object of the invention to provide a novel method for producing a new mold of unique composition for production of such non-round glass shapes.

Another object of the invention is to provide a mold and method of making same having a high surface quality, which can withstand repeated applications of high temperatures of molten glass and subsequent cooling in production cycles, and having no adverse properties affecting the glass, with an unlimited shelf life and a useful production life far in excess of 1200 cycles.

It is a further object of the invention to provide a mold which can be produced quickly and economically in a fraction the time required for a steel mold, and at a fraction of the cost.

It is a further object of the invention to provide a method for making a mold composed of a amorphous fused silica composite, which can withstand the extreme operating temperatures of molten glass, has high resistance to thermal shock and a virtually nil coefficient of thermal expansion and shrinkage.

Additionally, the molds of this invention can easily have built into them vents, and cooling or heating passages as well as decorative elements, thus providing a mold and method of manufacture affording unprecedented flexibility in design and production, as well as flexibility for financial planning for full production.

Yet another object of this invention is to provide a method of mold fabrication which is of such simplicity and low cost as to enable a manufacturer of non-round glass shapes to test the market for new shapes at reduced and reasonable cost, compared to the prior art, and with the flexibility to commence immediate full scale production without the expense and lead time previously required for fabrication of conventional steel molds for non-round shapes. This can allow a greater number of products to enter the marketplace which would have been heretofore uneconomical and can provide a new impetus in the glass industry by contributing greater competition through design ideas rather than simply through price.

Other objects and advantages of this invention will be seen from the above and the following description of the preferred embodiments when considered with the drawings and appended claims.

BRIEF DESCRIPTION OF DRAWINGS

The above and other objects and significant advantages of the invention are made clear by the following description thereof, taken in conjunction with the accompanying drawings in which.

DETAILED DESCRIPTION OF THE PREFERRED EMBODIMENTS

Figure 1:
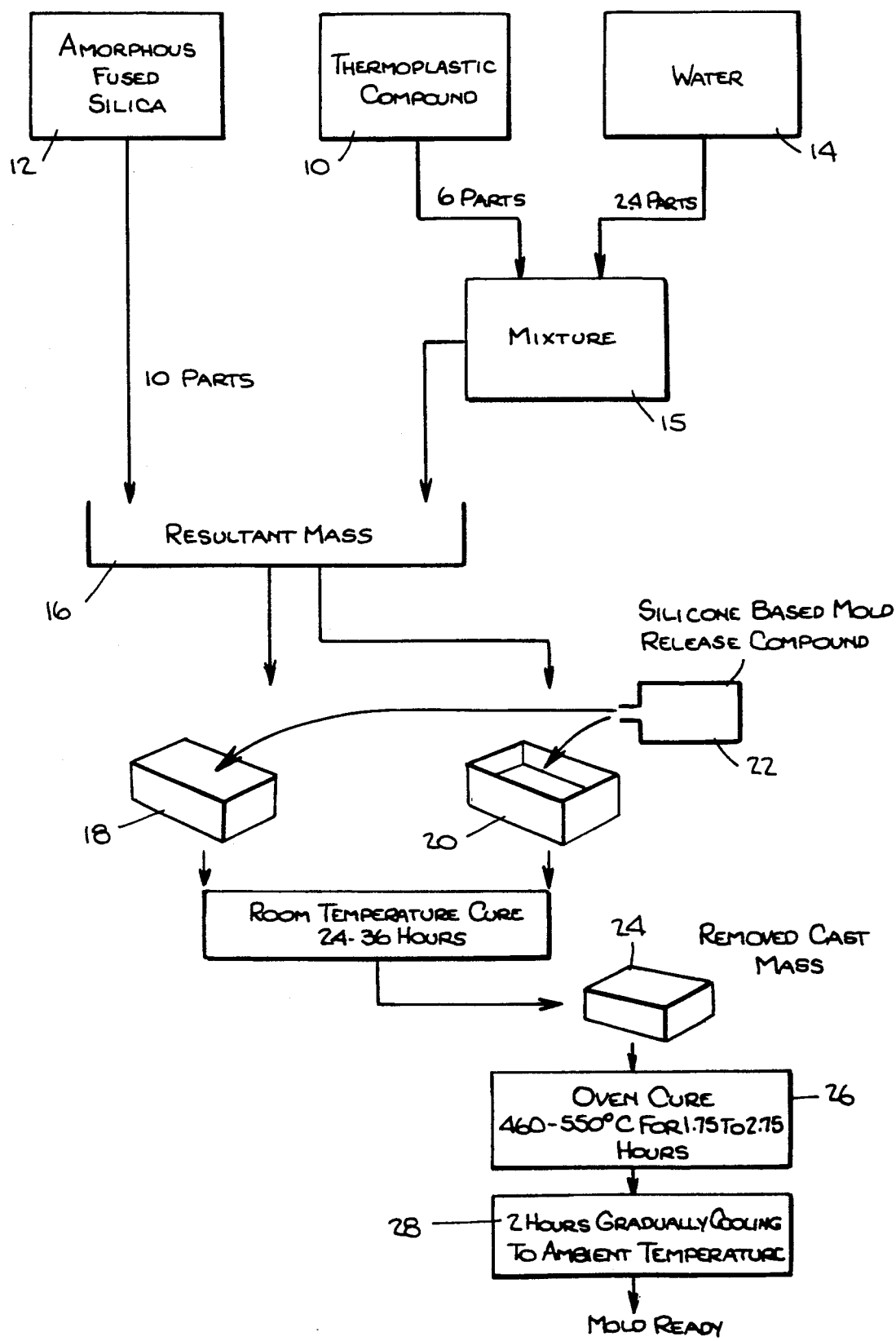
FIG. 1 is a flow chart for the method of making the molds.

Referring to FIG. 1, the method for manufacture of the molds begins with a combination of raw materials consisting of a hydraulic compound 10, amorphous fused silica 12, and water 14. The hydraulic compounds and amorphous fused silica are of the kind known in the art for preparing room temperature cured molds for soft metal foundry applications at temperatures in the range of from 900° F. up to 2000° F. (1100° C.).

For example, such compounds and silica components are currently sold as separate parts of a mold preparation kit, by A.C.E. Inc., Plainview, New York under the trade name "ACEramic" (TM) Pourable P/N 3000-1.

A representative sample of Part A of the compound "ACEramic" (TM) Pourable P.N 3000-1 is composed primarily of alpha-aluminum oxide (corundum), non-crystalline silicon dioxide, calcium aluminum silicate and free alkali in the following approximate proportions:

| | |
|---|---|
| $Al_2O_3$ | 30% |
| CaO | 7% |
| $SiO_2$ | 56% |

These proportions of the composition of Part A of the ACEramic (TM) compound are based not on manufacturer's data but on an independent laboratory analysis obtained by the applicant and believed to have accuracy of plus or minus of 10% relative to the percentages given. Accordingly, the Part A compound should be understood as composed of the following:

| | |
|---|---|
| $Al_2O_3$ | in the range of 27%–33% |
| CaO | in the range of 6%–8% |
| $SiO_2$ | in the range of 50.4%–61.6% |

However, as used in this invention, the manufacturer's ratios for mixing and the curing instructions as described above in connection with the prior art, are not followed and to the contrary, the following ratios and curing sequence are used:

In the preferred embodiment of the invention, the three ingredients are combined by weight in the following ratio:

a) Compound: 6 parts;
b) Amorphous fused silica: 10 parts;
c) Water: 2.4 parts.

The process for mixing the pourable mass is shown schematically in FIG. 1 as follows, using a specific example of ratios:

At room temperature, two and four tenth parts water 14 is mixed into 6 parts of compound 10 (in the form of powder) in such a way as to thoroughly impregnate the compound and form a mixture 15. This can be accomplished either by hand mixing or any of a variety of machine-mixing methods. For example, at least 5 minutes of hand mixing is required.

The water-compound mixture 15 is then mixed with ten parts of the amorphous fused silica component 12 which is in the form of crystals of approximately 0.25 of an inch in length by an average thickness of 0.5 mm. This mixing procedure can be accomplished either by hand mixing or by any of a variety of machine-mixing methods. The silica component must be thoroughly impregnated with the compound water mixture. At least 5 minutes of hand mixing is required.

The resultant mass 16 will have the consistency of a coarse quartz-cement, and can be poured over a positive mold 18, or into a negative mold 20, which has been pretreated with a known silicone based mold-release compound 22, such as from an aerosol. The mold-release compound 22 is thoroughly rubbed into the inner surface of the negative master pattern mold 20 or outer surface of the positive master pattern mold 18.

The poured mass 16 is room-temperature cured in the preferred embodiment for between 24 and 36 hours, after which the cast mass 24 is removed from the original mold.

The cast mold 24 is then temperature-cured in an oven 26 at a temperature approximately ⅓ of the temperature at which the mold will be used in glass production. For crystal which has an operating temperature in the 1100° C.–1400° C. range, the cure temperature is in the range of from 460° C. to 550° C. for a period of 1.75 to 2.75 hours followed by a controlled two hour linear cooling or a static cooling from the cure temperature to ambient room temperature, step 28. This heat curing solidifies the mold and is believed to relieve stress in the molds and eliminate any excess moisture.

Depending on the resulting mold surface and desired surface quality of glass production, some surface preparation using cork polishers may be applied to further finish the surface of the mold. Molds having finer or coarser surfaces and requiring longer or shorter cure times, with decreased or increased useful cycle life can be formed by slightly varing the weight ratios of the ingredients in a manner determined by reasonable experimentation. For example, a finer mold surface requiring less polishing can be formed by increasing the ratio of water by 5%, and utilizing the room temperature curing for a minimum of 36 hours.

The temperature-cured mold is now ready for repeated use. Parts can be blown into it, by hand or machine, or glass material can be cast on or into it, including by well-known glass press molding methods. Cooling of the mold after each use can be accomplished using forced air at room temperature as well as by water having a temperature in the range of 5° C. to 100° C., with no adverse effects on the mold or the surface quality within the mold cavity. The molds are many times stronger than prior art sand cast shell molds intended for one time use in foundry applications. Depending on wall thickness, temperature of the material being processed, and exposure time to these temperatures, a mold of the present invention can be used for repeated piece production and yield up to 2000 glass pieces before any significant deterioration of the mold.

The master pattern mold, as for example 18 and 20 in FIG. 1, over or into which the pourable mass is placed, can be fabricated from well known materials such as plaster, acrylic, aluminum and hardwoods among others. Since the finished cast mold will be an exact impression of the master pattern, great care must be taken in the finishing of the pattern. The smoother the surface of the pattern, the better the surface will be in the cast mold.

The material used in the fabrication of the master pattern will probably be selected on the basis of cost and ease of fabrication. Hardwoods offer the combination of inexpensiveness and ease of fabrication using the most common tools. In addition they are capable of being finished to very smooth surfaces. For these reasons, the woods are preferred for master pattern fabrication, though the use of plastics and metals is not precluded, if simply for the longer life they will provide to the master pattern. A wooden pattern, if properly finished and cared for after use, will provide twenty or more cast molds of this invention before showing any real signs of deterioration. This makes the wooden patterns extremely cost-effective.

The master pattern is made and finished to the highest degree of surface smoothness and detail. The pattern will look similar to those used in the making of sandcasting molds used in the molten-metals industry. The master pattern mold is painted using a lacquer, preferably of a dark color, in order to see the surface of the pattern, and any imperfections in the surface. This surface is sanded and buffed in accordance with known procedures to obtain a polished finish. More than one coat of lacquer will usually be required.

The lacquer painted master pattern is then sealed using clear polyurethane paint, sprayed on in three or four thin coats. This is important in order to impregnate the wood of the master pattern, and protect it. Furthermore, the polyurethane yields a surface of great smoothness and hardness, which will contribute to the surface of the cast mold and the long life of the pattern.

The pattern is then coated with a mold-release compound consisting of a silicone aerosol spray commonly known and used with thermoplastic resin mold materials. Three or four coats are required and, once allowed to dry, will permit easy removal of the cast mold from the master pattern, although the cast mold will also be readily removable if allowed to air cure for at least 36 hours on a polished master pattern.

A container is constructed around the master pattern in order to contain the poured mold, and in such a way as to allow for desired wall thicknesses and the containment of the water used in mixing the composite. It is important that this container be impregnable, and that the poured composite mass be allowed to dry over a period of 24 to 36 hours. Once the composite mass is poured into the container (over the pattern) the mold must be covered with plastic to limit evaporation of the water in the poured mass. The mold is then cured in accordance with the procedure previously described.

Press Molds and high-pressure mold

When fabricating molds of this invention which are to be used in highly stressed situations such as in glass pressing operations or in high-pressure blowing applications, often using 10–25 atmospheres of pressure, the cast molds will need to be reinforced both on the inside and on the outside. Such a composite two part mold is shown in FIGS. 2-3.

Reinforcing the mold parts 46 and 48 can be accomplished in much the same way as reinforcing concrete in the building industries, through the use of reinforcing metal rods configured in a three-dimensional grid (not shown), contained within the poured mass. A problem arises in these molds due to the high operating temperatures and the very low coefficients of shrinkage and expansion. For these reasons it is impossible to simply place the grid of rods within the mold, because once the mold reaches an elevated temperature, the metal rods will expand, creating some risk that the mold will then crack, due to the stress from the expansion of the rods. Therefore, when constructing the reinforcement grid from stainless steel rods, the entire grid must be coated with a 0.5 to 1.0 millimeter layer of a liquid vinyl such as that known as PLASTISOL (TM) liquid vinyl. This will impart to the grid an added thickness which will be burned off during the heat cure cycle, leaving gaps to provide expansion chambers within the mold, to accommodate the expansion and shrinkage of the embedded steel grid during use. The cured mold will, in effect, have a floating reinforcement within it.

When reinforcing the outside of the mold, primarily to contain the mass in the event of catastrophic failure, a simple steel or iron container will in most cases suffice.

Figure 2:
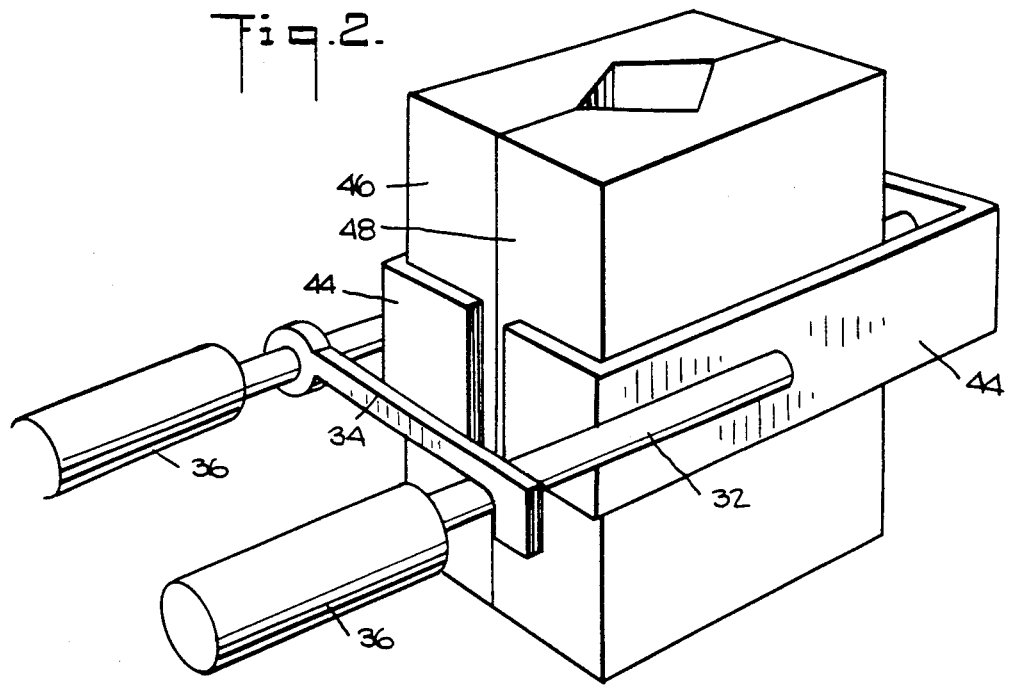
FIGS. 2 and 3 are two different perspective views, showing respectively front and back of a composite two-part mold of the invention, with opening at the top, and hinged reinforcing assembly.
Figure 3:
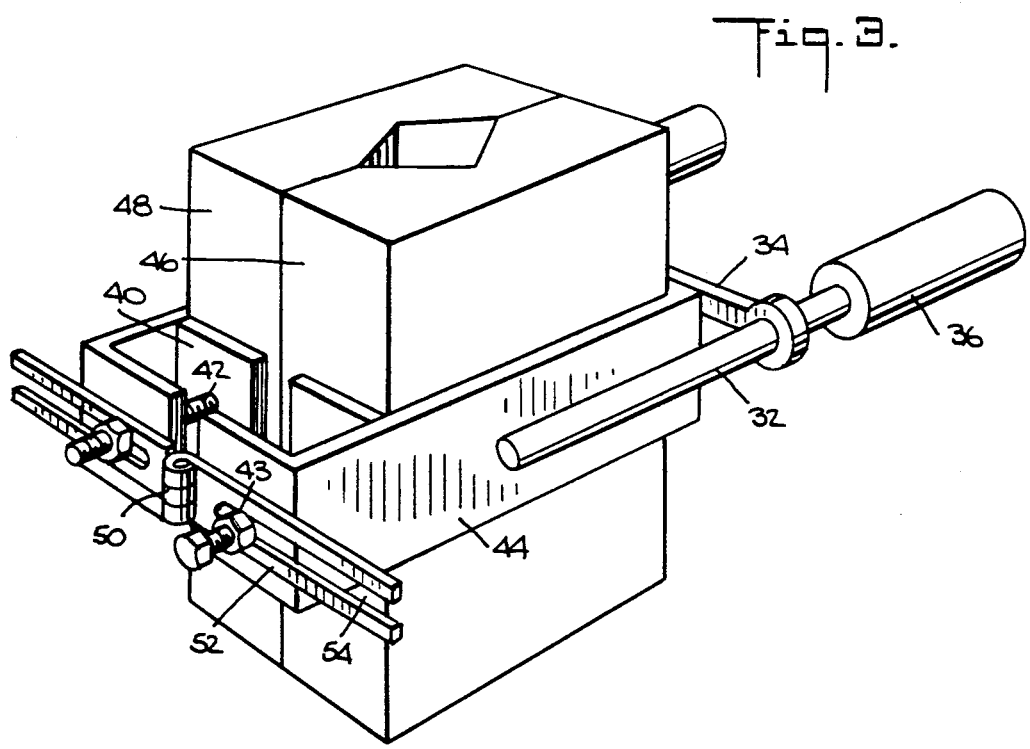

This steel container should be a completely separate bolt-on assembly, as shown in FIGS. 2 and 3 with no parts actually fastening into the mold mass. The container should be constructed of metal sufficiently strong to withstand the pressures involved in the given application. This, of course, will vary from case to case, and will also depend on the requirements of the equipment being used.

Figure 4:
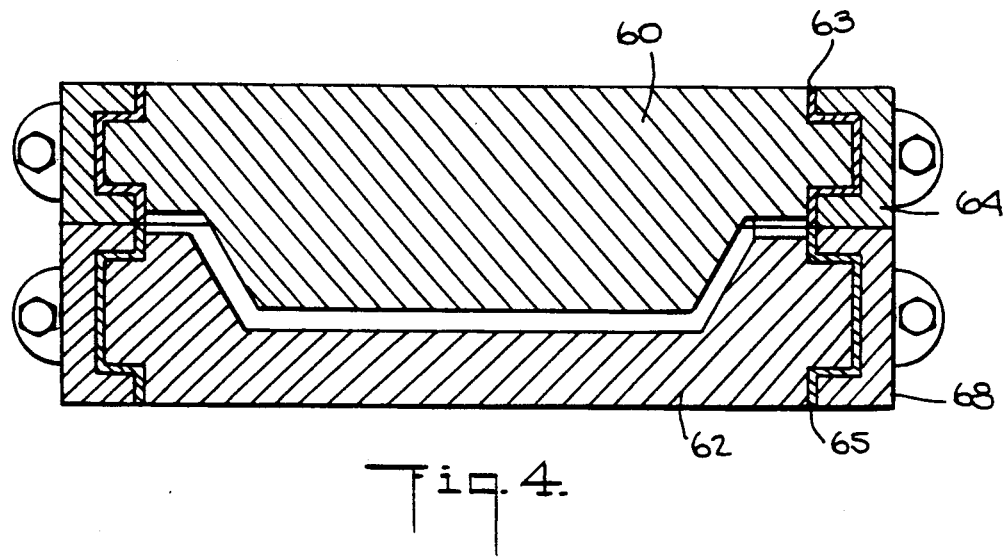
FIG. 4 is a partial cross-section view of a reinforced male plunger mold and matching female mold, which are shown in a fuller perspective view in FIG. 5.
Figure 5:
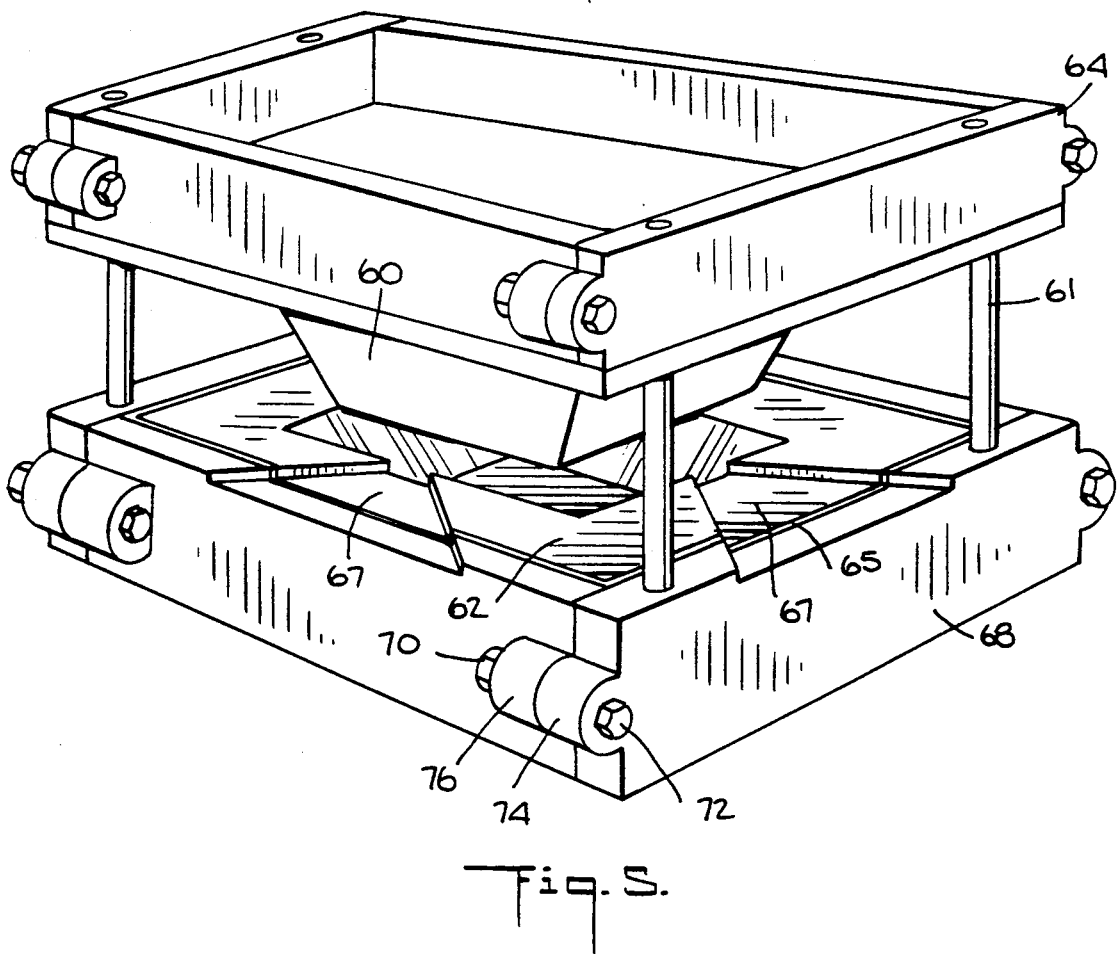
FIG. 5 is a perspective view of a male plunger mold and a matching reinforced female mold.

Another method for reinforcing the molds is simply to place them within a steel casing enclosure, with a thin buffer plate of brass between the poured mold and the steel casing to accommodate the shrinkage and expansion of the steel case, as shown in FIGS. 4 and 5.

It is very important to note that due to the differential coefficients of expansion, under no circumstances can metal screws, bolts or other fasteners, be placed directly in the poured mold. For this reason, as shown in FIGS. 2, 3, 4 and 5, the mold is secured within an enclosure, with fastening of the enclosure accomplished from the outside, fastening each piece of steel to the other, with no metal parts within the mold itself.

When fabricating molds of complex form requiring more than one part, and thus the opening and closing of the mold around the blown parison, it is necessary to use a simple system for such opening and closing, allowing the easy ingress and egress of the glass. This applies to all shapes which are not conical in elevation.

FIGS. 2 and 3 illustrate a simple hinged enclosure fabricated from steel or other metal, allowing the retention of the mold parts 46 and 48 within the enclosure sides 44 and end pressure plates 40. As in the simpler forms, no metal fasteners are used within the mold parts. Pressure plates 40 are held against the mold parts 46 and 48 through the use of bolts 42 which pass through holes in the back of the side enclosures 44 and then through hinge plates 52 connected by hinge 50. The bolts are then secured to the hinge plates 5 by nuts 43. Slots 54 in the hinge plates 52 permit adjustment for width in order to accommodate a wide range of mold widths, thus eliminating the need for separate enclosures for each mold. The molds are opened and closed using handles 36, each connected to a rod 32. These are used to lock the side enclosures 44 closed at the end opposite the hinge plates 52, through the use of a hooked bar 34 of suitable length, which rotates about one rod 32 to lock across the opposite rod.

FIGS. 4 and 5 show a composite male plunger press mold 60 which moves on locating pins 61 to mate with a female composite mold 62. The male mold 60 is surrounded by a steel retention ring 64, shown in cross-section in FIG. 4, with a brass bushing 63 interposed between the mold 60 and the retention ring 64. The male mold 60 is dimensioned to register with the upper surface of the female mold 62 and its supporting steel casing, 68. A brass bushing 65 is interposed between the female mold 62 and the steel casing 68. In addition, the female mold may have vents 67 as shown in FIG. 5, formed in the female mold. The sides of the steel casing 64 and 68 are secured externally with nuts 70 on bolts 72 passing through the bores of suitably aligned flanges 74 and 76 on abutting sides of the steel casing 68. The molten glass can thus be pressed into shape between female mold 62 and male mold 60.

When fabricating a mold for high pressure glass blowing, a steel enclosure combining the full coverage illustrated in FIG. 5 combined with the hinged opening and closing characteristics illustrated in FIGS. 3 and 4 is used.

It is also to be understood that many other variations, such as in the sizes and shapes of the molds shown and described for the preferred embodiments, may be resorted to and recognized by those skilled in the art, without departing from the scope of the invention as defined in the appended claims.

I claim:

1. A method for making molds which comprises the steps of:
   (a) thoroughly mixing a hydraulic compound containing ingredients in the following approximate proportions:

| | |
|---|---|
| $Al_2O_3$ | 30% |
| CaO | 7% |
| $SiO_2$ | 56% | with water in the ratio by weight of six parts hydraulic compound to two and four-tenths parts water thereby forming a hydraulic compound composite;
   (b) thoroughly mixing the said hydraulic compound composite with amorphous fused silica in the weight ratio to the prior parts of ten parts amorphous fused silica, thereby forming a composite mass;
   (c) forming the composite mass into a mold shape;
   (d) curing the said composite mass at room temperature for a period in the range of 8 to 36 hours; and
   (e) curing the said composite mass at a temperature in the range of from 460° C. to 550° C. for a period ranging from 1.75 to 2.75 hours.

2. The method of claim 1 in which the step of mixing an amorphous fused silica is performed by mixing an amorphous fused silica in the form of crystals having a length of approximately 0.25 inch and an average thickness of 0.5 mm.

3. The method of claim 1 or claim 2 in which the last curing step is followed by a two hour linear controlled cooling to room temperature.

4. The method of claim 1 or claim 2 in which the last curing step is followed by a two hour period of static cooling in an ambient room temperature.

5. The method of claim 3 in which the last curing step is performed at a temperature of 550° C.

6. The method of claim 4 in which the last curing step is performed at a temperature of 550° C.

7. The method of claim 1 or claim 2 in which the step of forming the composite mass is performed by pouring the composite mass over a master pattern which has been covered on its surface with a silicone-based mold release compound.

* * * * *